Patented June 1, 1926.

1,587,005

UNITED STATES PATENT OFFICE.

AUGUST LEOPOLD LASKA AND FRITZ WEBER, OF OFFENBACH-ON-THE-MAIN, GERMANY, ASSIGNORS TO CORPORATION OF CHEMISCHE FABRIK GRIESHEIM-ELEKTRON, OF FRANKFORT-ON-THE-MAIN, GERMANY.

YELLOW MONOAZO DYESTUFFS AND PROCESS OF MAKING SAME.

No Drawing. Application filed September 10, 1925, Serial No. 55,629, and in Germany September 20, 1924.

Our invention relates to new yellow monoazodyestuffs corresponding probably in the state of free acids to the general formula:

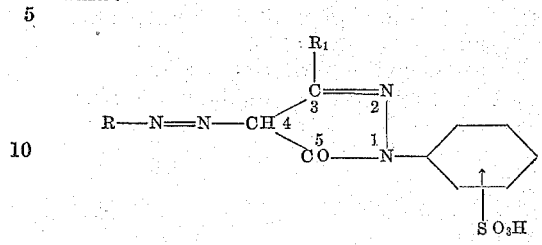

in which formula R represents the residue of a body of the diphenyl series, $R_1$ represents the group $CH_3$ or $COOH$, which dyestuffs are when dry yellow powders, soluble in water to a yellow solution, yielding on reduction with stannous chloride a monoamin of the diphenyl series and a 4-amino-1-sulfoaryl-5-pyrazolon body and dyeing wool in yellow shades especially fast to milling.

The new dyestuffs may be obtained by combining diazotized monoamins of the diphenyl series with 1-sulfoaryl-5-pyrazolon bodies. Under the latter term we include both 1-sulfoaryl-3-methyl-5-pyrazolons and 1-sulfoaryl-5-pyrazolon-3-carboxylic acid.

Especially valuable are the dyestuffs which are obtained by combining diazotized monoamins of the diphenyl-series with 1-sulfoaryl-3-methyl-5-pyrazolons having probably in the state of free acids the general formula:

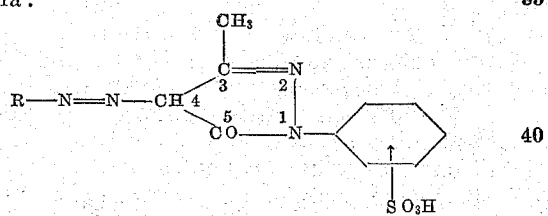

in which formula R represents the residue of a body of the dphenyl series.

The following example illustrates the invention, the parts being by weight.

Example.

238 parts of amino dichlorodiphenyl (obtained on starting from benzidin by substituting the amido groups by chlorine according to the method of Sandmeyer, by nitrating and reducing) are diazotized in a sufficient quantity of water with 285 parts of hydrochloric acid of 20° Bé. and 69 parts of sodium nitrite at 5–10° C. The clear diazo solution is poured into a solution of 302 parts of para-sulfo-ortho-chlorophenylmethylpyrazolon in 200 parts of water and 146 parts of caustic soda solution of 34° Bé., cooled with ice and made alkaline with corbonate of soda, until the production of dyestuff is finished. The dyestuff thus obtained, having probably in the state of the free acid the formula:

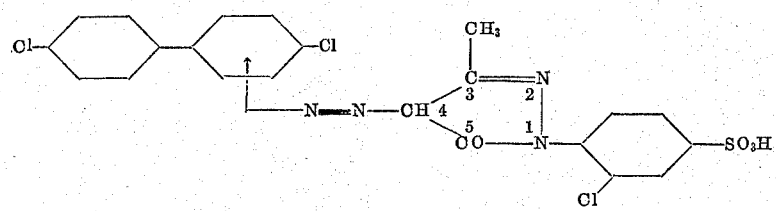

is worked up in the usual manner and yields on wool yellow shades, fast to milling.

In the same manner the combination may be conducted with other derivatives of pyrazolon, for example with para-sulfophenylmethylpyrazolon, or other diphenyl-bases, such as ortho-or para-aminodiphenyl, or aminodichloroditolyl (obtained on starting from tolidin by substituting the aminogroups by chlorine, nitrating and reducing) may be used.

Now what we claim is:

1. As new compounds yellow monoazodyestuffs, corresponding probably in the state of free acids to the general formula:

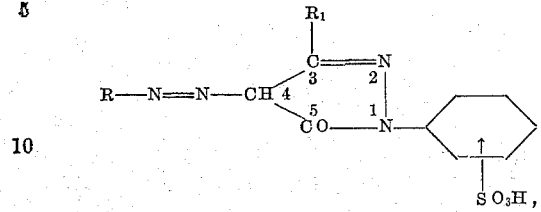

in which formula R represents the residue of a body of the diphenyl series, $R_1$ represents the group $CH_3$ or COOH, which dyestuffs are when dry yellow powders, soluble in water to a yellow solution, yielding on reduction with stannous chloride a monoamin of the diphenyl series and a 4-amino-1-sulfoaryl-5-pyrazolon body and dyeing wool in yellow shades, especially fast to milling.

2. A process of making yellow azodyestuffs consisting in combining diazotized monoamins of the diphenyl series with 1-sulfoaryl-5-pyrazolon bodies.

3. As new compounds yellow monoazodyestuffs, corresponding probably in the state of free acids to the formula:

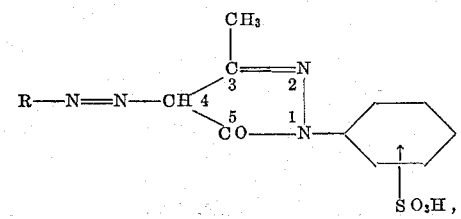

in which the formula R represents the residue of a body of the diphenyl series, which dyestuffs are when dry yellow powders, soluble in water to a yellow solution, yielding on reduction with stannous chloride a monoamin of the diphenyl series and a 4-amino-1-sulfoaryl-3-methyl-5-pyrazolon and dyeing wool in yellow shades, especially fast to milling.

4. A process of making yellow monoazodyestuffs consisting in combining diazotized monoamins of the diphenyl series with 1-sulfoaryl-3-methyl-5-pyrazolons.

5. As a new compound, a yellow monoazodyestuff, having probably in the state of the free acid the formula:

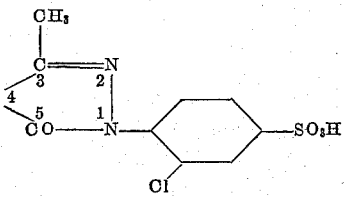

which dyestuff is when dry a yellow powder, soluble in water to a yellow solution, yielding on reduction with stannous chloride amino-4.4'-dichlorodiphenyl and 1-para-sulfo-ortho-chlorophenyl-3-methyl-4-amino-5-pyrazolon and dyeing wool in a yellow shade, especially fast to milling.

6. A process of making a new yellow monoazodyestuff consisting in combining diazotized amino-4.4'dichlorodiphenyl with 1-para-sulfo-ortho-chlorophenyl-3-methyl-5-pyrazolon.

In testimony, that we claim the foregoing as our invention, we have signed our names, this 31st day of August 1925.

AUGUST LEOPOLD LASKA.
FRITZ WEBER.